UNITED STATES PATENT OFFICE.

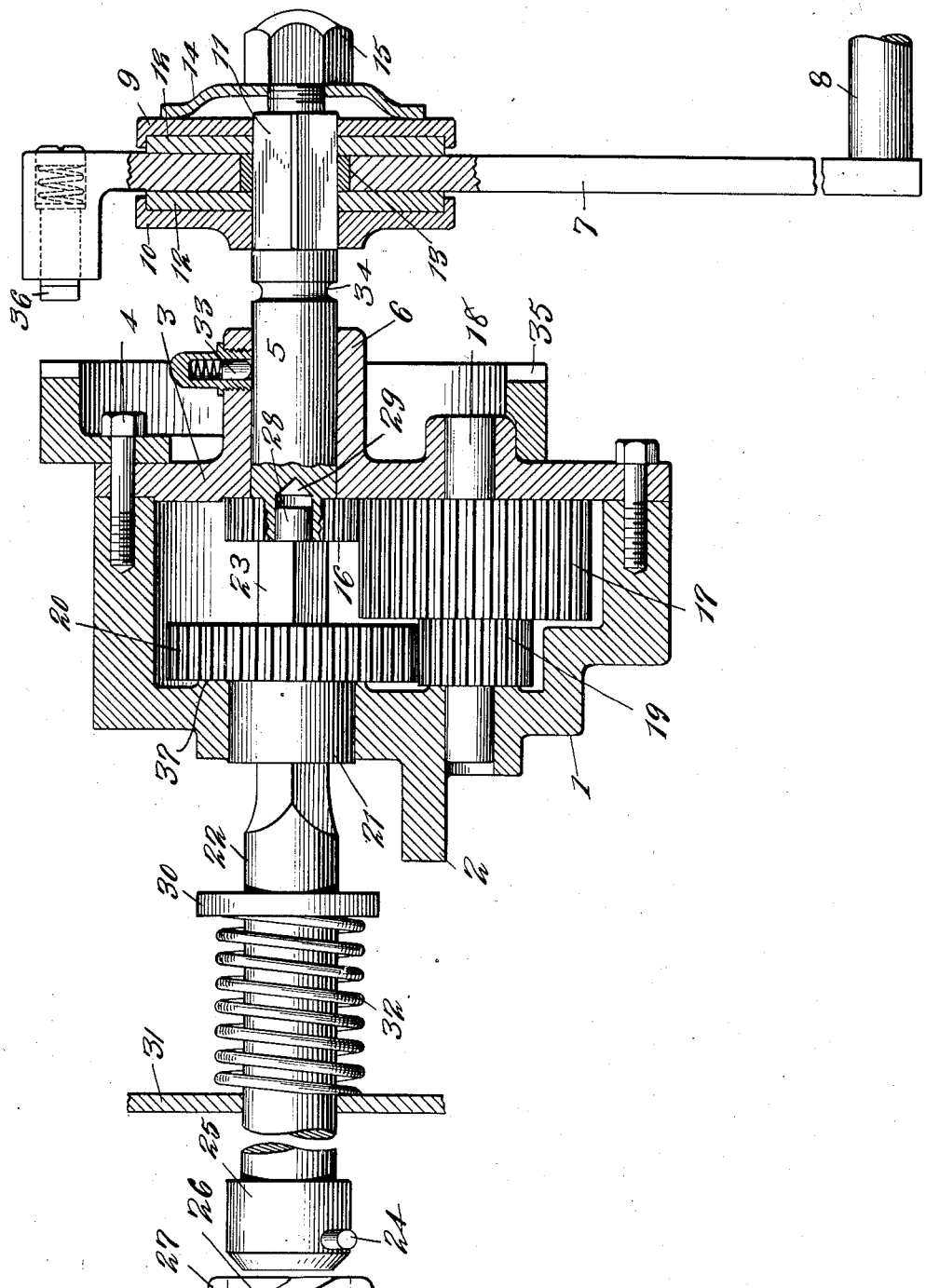

LOUIS MASTRANGEL, OF HOBOKEN, NEW JERSEY, ASSIGNOR, BY MESNE ASSIGNMENTS, TO EDWARD V. HARTFORD, OF NEW YORK, N. Y.

STARTING DEVICE.

1,364,851.	Specification of Letters Patent.	Patented Jan. 4, 1921.

Application filed December 9, 1910, Serial No. 596,397. Renewed January 26, 1918. Serial No. 214,033.

*To all whom it may concern:*

Be it known that I, LOUIS MASTRANGEL, a citizen of the United States, residing at Hoboken, in the county of Hudson and State of New Jersey, have invented certain new and useful Improvements in Starting Devices, of which the following is a full, clear, and exact specification.

This application is a renewal of my application, Serial Number 596,397, filed December 9th, 1910, and the invention relates to starting devices for internal combustion engines, having for an object to provide an improved device of this character which will enable the hand-operated crank to apply great power to the crank shaft of the engine, and which will provide a safety device for preventing backward movement of the engine being imparted to the hand of the operator.

In the accompanying drawing forming a part of this specification, a practical embodiment of a form of my invention is illustrated applied to the crank shaft of an internal combustion engine, the drawing being partly in elevation and partly in longitudinal section.

The frame work of the mechanism is shown in the form of a casing, one portion 1 of which is provided with a flange or supporting member 2, which may be secured at some convenient portion of the engine for the support therefor, as, for instance, if the device is used upon an automobile,—the chassis frame thereof. A cover portion 3 is shown secured by means of bolts 4 to the casing member 1. The frame or casing carries the bearings of the various parts of the mechanism.

The handle crank shaft 5 is shown mounted in an elongated bearing 6, in which it is free to rotate and to be reciprocated. The shaft may be rotated by means of a crank 7 provided with an operator's handle 8. The connection between the shaft 5 and crank 7 is preferably frictional. As herein shown this connection comprises a pair of washer cups 9 and 10 mounted upon the squared end 11 of the shaft 5. Within each of these cups is mounted a friction disk or washer 12. Between such washers or friction disks there is mounted upon the squared end of the shaft a bearing member 13 forming a bearing for the eye of the crank. The sides of the crank produce frictional contact with the washers or friction disks, the amount of which friction may be regulated by means of a spring washer 14 and set screw 15.

The inner end of the shaft 5 has fast upon it (in the present instance integral therewith) a pinion 16 meshing with a gear wheel 17, the latter being mounted on a shaft 18 having bearings in the respective frame or casing members 1 and 3. A pinion 19 is fast with the gear 17 and meshes with a gear 20 fast with a hub 21, the latter having a bearing in the casing member 1. In the present showing the ratio of the gearing is substantially 6 to 1.

A starting shaft 22 is shown provided with a squared end 23 passing through a squared aperture in the hub and gear 21 and 20, respectively. The starting shaft 22 has means for connection with the crank shaft of the engine and is in axial alinement therewith, being also in axial alinement with the handle crank shaft 5. The connection herein illustrated comprises a pin 24 carried by a hub 25 fast upon the shaft 22. This pin is adapted to engage one of the slots 26 in the engine crank shaft 27 when the shaft 22 is moved longitudinally to the left, as viewed in the drawings, and is rotated in a clockwise direction.

The face of the pinion 16 is narrower than the face of the gear wheel 17 so that the pinion 16 may traverse the working face of the gear 17 and remain in mesh therewith. This is for the purpose of permitting longitudinal movement of the handle crank shaft 5 and the pinion 16 for the purpose of moving the starting crank 22 into engagement with the engine crank shaft 27. The outer end of the starting crank shaft 22 is provided with a cylindrical bearing portion 28, constituting a bearing freely seating in a cylindrical socket or bearing 29 in the inner end of the shaft 5. Suitable shoulders are provided between the ends of the shafts 5 and 22 for forcing one shaft to move in front of the other as power is applied to either, moving it inwardly of the casing. The starting crank shaft 22 may be moved outwardly from the engine crank shaft in some suitable manner. In the present instance the shaft is shown carrying an adjustable collar 30, between which collar and an abutment portion 31 a compression spring 32 may be mounted normally tending to move the clutch member 24 out of engagement with the slot 26 in the engine crank shaft, and also tending to force the handle crank shaft 5 to its outward or right-hand position, as illustrated in the drawing. The bearing 6 carries a spring pressed plunger 33 adapted to engage a circumferential groove 34 in the shaft 5 when the latter is moved to its inward or left-hand position, which position corresponds to the operative position of the device.

A circular ratchet 35 is mounted upon the casing and held in position thereon by means of the bolts 4. This ratchet is disposed concentric to the axis of rotation of the shaft 5. The crank 7 is shown carrying a spring pressed pawl 36 adapted to engage the ratchet 35 when the shaft 5 is in operative position.

The drawings illustrate the device in an idle or inoperative position. When it is desired to start or crank the engine, the handle crank shaft 5 may be moved toward the left, as illustrated in the drawings, until the spring plunger 33 seats in the circumferential groove 34. During this internal movement, if desired, the crank may be turned slightly for the purpose of causing the coupling pin 24 to find a seat in one of the slots 26 in the engine crank shaft. The longitudinal movement of the shaft 22 will, of course, be effected by means of the pinion 16 traversing the gear wheel 17 causing the squared end of the shaft 22 to traverse the squared opening in the gear wheel 20 and hub 21; at the same time the spring 32 will be forced under compression. After the parts have assumed their operative position, the pawl 36 will come into inoperative engagement with the ratchet 35. The teeth of such ratchet are disposed in such a position and are directed at such angles that the pawl will freely pass over them when the handle is rotated in the direction of rotation of the engine shaft, but in such direction that the pawl will not be permitted to pass over them if the shaft tends to move backwardly.

Immediately upon the starting of the engine the clutch between the engine crank shaft and the starting shaft 22 will force these members apart and will move or tend to move the shaft 22 outwardly, this outward movement of the shaft being facilitated by the spring 32.

It will be noted that my improved structure provides a yielding driving connection not only for the usual or ordinary operation, but also for the unusual or abnormal operation which occurs when the engine backfires; that is, this yielding connection is doubly useful. First, it limits to a definite and adjustable amount the torque which may be applied to shaft 5. For example, a certain adjustment is desirable so as to limit the turning effort which may be imparted, otherwise all the power applied would be transmitted through the gear train with a 6 to 1 ratio to the shaft 22 with the added leverage of the long crank 7. All this mechanical advantage on the pin 24 which is on a short radius would likely result in damaging the pin or entirely shearing it off. The yielding connection provided will, therefore, absorb any suddenly applied forces in excess amounts and prevent injury to the parts.

Secondly, by this frictional connection injury to the operator is insured against, for the yielding drive is ready to absorb practically all the energy transmitted from the engine as a result of backfire. A small portion of the effect of the backfire will be transmitted through the yielding drive to the operator, and this only for a short period of time, for the ratchet and pawl connection 35, 36 will function to arrest the backward movement of the crank 7, and the friction disks will act as a brake, retarding the backward movement of the engine shaft and therefore stalling it.

In case the disengagement of the clutch members between the engine crank shaft and the starting shaft should be sluggish, the blow received by the operator at the handle 8 will be minimized by the lever which will be in favor of the operator against the engine, and also by means of the frictional connection between the crank 7 and its shaft 5. It will be noted that the axes of rotation of the shafts 5, 22 and 27 are in axial alinement and that the axis of rotation of the operator's handle 8 will be in the prolongation of the axis of rotation of the shaft which is intended to stop.

The device may be readily assembled and taken down. The entire casing, which is more or less in the nature of a gear box, may be removed from the engine or from its support by disconnecting it, when the starting shaft 22 may be left upon the engine or may be removed with the gear box as may be desired. Should it be desired to leave it upon the engine the squared end will readily pass through the gear wheel and its hub, and the bearing portion 28 of the shaft will readily free itself from its bearing in the socket 29 of the shaft 5. The cover portion of the casing 3 may be removed from the portion 1, and with it will be removed the shaft 5 and its gear wheel 16. Such gear wheel and shaft may then be removed from the cover by removing the crank 8 and its appendages from the outer end of the shaft 5.

The gears are compact in arrangement and are shown held in position by the casing and by engagement one with another. It will be seen that the gear 20 is prevented from moving longitudinally in one direction by means of the bearing face 37 on the inside of the casing member 1, and in the other direction by engagement with the face of the gear wheel 17. It will also be seen that the outward limit of movement of the handle crank shaft 5 and the gear wheel 16 is determined by the inner face of the cover member 3. The gear wheel 17 and the pinion 19 are shown having a working fit between the two portions of the casing.

My improvement is capable of being embodied in a commercial article of manufacture which may be sold separately and applied to existing forms of engines, particularly automobiles, and which may be readily attached to the same or removed therefrom as occasion may require. Inasmuch as the operating parts of the mechanism are self-contained, the gear box, as a whole, may be moved from place to place and applied to and removed from the engine with which it is intended to be used.

It is to be understood that I have illustrated but one form of my invention and that various changes may be made therein without departing from the spirit and scope thereof; the ratio of the gearing is also merely illustrative.

What I claim as new herein and desire to secure by Letters Patent is:—

1. The combination with an engine crank shaft, of a starting shaft and clutch mechanism for releasably connecting said starting shaft to said engine crank shaft, a handle crank shaft, a crank frictionally connected to said handle crank shaft and provided with means to operate the engine shaft, and means carried by said crank to lock the same against movement upon a retrogressive movement of said engine crank shaft.

2. The combination with an engine crank shaft, of a starting shaft, clutch mechanism for releasably connecting said starting shaft to said engine crank shaft, a handle crank shaft, an end of which is in engagement with an end of the starting shaft, all of said shafts being in axial alinement, a crank frictionally connected to said handle crank shaft, said handle crank shaft being capable of movement in a longitudinal direction to function the clutch mechanism whereby said engine crank shaft may be revolved by rotation of the crank, and means carried by the crank to positively lock the same against rotation with the handle crank shaft upon a retrogressive movement of the engine crank shaft.

3. In a starting device, the combination with a casing or framing member, of a handle crank shaft mounted therein for rotary and axial movement and provided with a pinion, a gear wheel meshing with the pinion and longer in an axial direction than the pinion, a pinion fast with the gear wheel, a second gear wheel meshing with the second pinion, a starting shaft having a sliding connection with said second gear wheel, and means for yieldingly holding the said starting shaft in engagement with the handle crank shaft.

4. In a starting device, the combination with a casing or framing member, of a handle crank shaft mounted therein for rotary and axial movement and provided with a pinion, a gear wheel meshing with said pinion and longer in an axial direction than said pinion, a pinion fast with said gear wheel, a second gear wheel meshing with the second pinion and provided with a squared axial opening, a starting shaft provided with a squared end mounted in said opening for reciprocation, and spring means for holding the starting shaft in engagement with the handle crank shaft.

5. In a starting device, the combination with a shaft and means for supporting the same for rotation and axial movement, of a pinion carried thereby, the pinion end of the shaft being provided with a bearing, a shaft disposed in axial alinement with the first-named shaft and mounted for reciprocation and provided with a bearing engaging the bearing of the first-mentioned shaft, a gear wheel mounted on the second shaft for permitting relative reciprocatory movement thereof, and a train of gearing between said pinion and gear wheel.

6. In a device of the character specified, the combination with a casing member provided with a flange for engaging the chassis frame, of a cover member therefor, said casing member being provided with a bearing, a gear wheel provided with a hub mounted in said bearing, said gear wheel and hub having a squared axial opening, a starting shaft having a squared portion mounted in said opening and provided with a reduced cylindrical end and a shoulder, said cover member being provided with an elongated bearing in axial alinement with the bearing for said hub, a handle crank shaft mounted in said bearing, said shaft being provided within the casing with an integral pinion and provided with a cylindrical socket and shoulder for receiving the cylindrical end and shoulder of said starting shaft for moving this toward an engine shaft, the casing and cover being provided with alined bearings, a shaft in said bearings, a gear wheel mounted on said shaft, said gear wheel being longer axially than the axial length of said pinion, a pinion fast to said gear wheel, said pinion and gear wheel being held in axial position by the engaging inner faces of the casing and cover, said last-mentioned pinion being in mesh with the first-mentioned gear wheel, which is held from axial movement by engaging the inner face of the casing and the outer face of the second-mentioned gear wheel, a coiled spring for moving the end of the starting shaft into the casing, and a clutch member carried by said starting shaft.

7. The combination with an engine shaft, of a starting shaft in axial alinement therewith, a coupling for said shafts constructed and arranged for uncoupling upon forward engine movement of the engine shaft, an axially reciprocable handle crank shaft in axial alinement with said shafts, a pinion carried by said handle crank shaft, a gear wheel provided with an angular axial opening, said starting shaft being provided with an angular end seated in said opening for reciprocation therein, a gear wheel and a pinion fast together and in mesh with the pinion of the handle crank shaft and the gear wheel mounted on the starting shaft, respectively, a thrust bearing connection between the handle crank shaft and the starting shaft, means for pressing the starting shaft toward the handle crank shaft, the handle crank shaft being provided with a circular groove, a spring pressed plunger for traversing said groove for holding the starting shaft in its working position, the end of the handle crank shaft being of angular formation, friction disk cups mounted upon said angular portion, friction disks located within said cups, a crank mounted for rotation upon said angular portion between said disks, a spring washer, means for tightening the same for regulating the friction, a handle mounted on said crank, a pawl carried by said crank, and a rack located in position for the engagement of said pawl upon the movement of the handle crank shaft to operative position for preventing reverse movement of the same.

8. In a starting device, the combination with an engine shaft, of a casing, a handle crank shaft rotatably and slidably mounted therein, a gear on said crank shaft, a second gear meshing with the first gear and longer in an axial direction than the first gear, a third gear rigidly connected to the second gear, a second shaft slidably mounted in axial alinement with the said crank shaft, a clutch on said second shaft adapted to engage the engine shaft, a fourth gear on said second shaft and adapted to rotate therewith, and means for yieldingly holding the second shaft out of engagement with the engine shaft and in engagement with the crank shaft.

9. In combination with an engine shaft, a starting shaft, clutch mechanism for releasably connecting the engine shaft to the starting shaft, a crank shaft, a crank frictionally connected to said cranking shaft, means for permitting the movement of said cranking shaft in a longitudinal direction to effect the connection of all of said shafts whereby the engine shaft may be rotated by the movement of said crank in a rotary direction, and means carried by said crank to positively lock the same against movement upon a retrogressive movement of said engine shaft, said frictional connection thereby operating to limit the retrogressive movement of all of said connected shafts.

10. An engine starter, comprising in combination with a member operatively connected with the engine, an operator, a rotatable member, a driving member mounted to travel longitudinally relative to the rotatable member into engagement with said engine member and also to rotate therewith, and a yielding driving connection between the operator and rotatable member.

11. An engine starter, comprising in combination with a member operatively connected with the engine, an operator, a rotatable member, a driving member mounted to travel longitudinally relative to the rotatable member into engagement with said engine member and also to rotate therewith, and a connection between the rotatable member and the operator, said connection comprising a spring.

12. In combination with an engine, a starter therefor, comprising an operating shaft, an engine starting shaft in axial alinement end to end therewith, the end of one shaft having a recess to receive the end of the other shaft thereby providing a bearing, means interconnecting them whereby the starting shaft is rotated by the operating shaft, said bearing being within the length of said means, said engine starting shaft being thrust lengthwise in starting the engine, said recessed end providing a shoulder to receive the thrust.

13. In combination with an engine, a starter therefor, comprising an operating shaft and an engine starting shaft in axial alinement end to end therewith, the adjacent ends being one male and the other female to provide a bearing, and the other end of the starting shaft carrying means for engagement with a portion of the engine, the operating shaft being provided with yielding driving means.

14. In combination with an engine, a starter therefor, comprising a shaft, means including a yielding connection for driving said shaft, a pinion, means for operating said pinion by said shaft, and means operable by said pinion for turning over said engine.

15. In combination with an engine, a starter therefor, comprising a shaft, means including a spring pressed yielding frictional connection for driving said shaft, a pinion, means for operating said pinion by said shaft, and means operable by said pinion for turning over said engine.

16. In combination with an engine, a starter therefor, comprising a shaft, means including a spring pressed yielding frictional connection for driving said shaft, a pinion, means for operating said pinion by said shaft, and means operable by said pinion for turning over said engine, said pinion and said last mentioned means having relative movement in the direction of the axis of the pinion.

17. In a drive of the character described, the combination of an operating member mounted for longitudinal movement, yielding means for driving the operating member, a driving member mounted for rotary and longitudinal movement, and when moved longitudinally adapted to be engaged with a part of the engine to be started, said driving member being so moved longitudinally by the operating member in its longitudinal movement, and a spring opposing said longitudinal movement.

18. In a drive of the character described, the combination of a power applying member mounted for both longitudinal movement when the power is supplied and for rotary movement, a driving member mounted for rotary and longitudinal movement, and, when moved longitudinally, adapted to be engaged with a part of the engine to be started, said first-named member coöperating with the driving member to move it longitudinally, the latter member being normally out of engagement with the engine part, toothed gear mechanism intermediate the members for transmitting rotary movement from one member to the other, and means for holding the driving member in such normal position.

19. In a drive of the character described, the combination of a power applying member mounted for both longitudinal movement when the power is supplied and for rotary movement, a driving member mounted for rotary and longitudinal movement, and, when moved longitudinally, adapted to be engaged with a part of the engine to be started, said first-named member coöperating with the driving member to move it longitudinally, the latter member being normally out of engagement with the engine part, toothed gear mechanism intermediate the members for transmitting rotary movement from one member to the other, and yielding means for holding the driving member in such normal position.

20. In a drive of the character described, the combination of a power applying member mounted for both longitudinal movement when the power is supplied and for rotary movement, a driving member mounted for rotary and longitudinal movement, and, when moved longitudinally, adapted to be engaged with a part of the engine to be started, said first-named member coöperating with the driving member to move it longitudinally, the latter member being normally out of engagement with the engine part, toothed gear mechanism intermediate the members for transmitting rotary movement from one member to the other, and a spring for holding the driving member in such normal position.

In witness whereof I have hereunto set my hand in the presence of two subscribing witnesses.

LOUIS MASTRANGEL.

Witnesses:
   CHAS. LYON RUSSELL,
   ISADORE BERNSTEIN.